United States Patent
Bito et al.

(10) Patent No.: US 6,501,250 B2
(45) Date of Patent: Dec. 31, 2002

(54) DEVICE AND METHOD FOR CONTROLLING INPUT/OUTPUT OF SECONDARY BATTERY

(75) Inventors: Seiji Bito, Shizuoka (JP); Yusai Murakami, Shizuoka (JP); Toshiaki Nakanishi, Aichi (JP); Kiwamu Inui, Aichi (JP); Kunio Kanamaru, Aichi (JP); Tadao Kimura, Hyogo (JP); Masayoshi Iwase, Aichi (JP); Katsuhiko Yamaguchi, Aichi (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 09/827,092

(22) Filed: Apr. 5, 2001

(65) Prior Publication Data

US 2002/0003417 A1 Jan. 10, 2002

(30) Foreign Application Priority Data

Apr. 28, 2000 (JP) ........................... 2000-131755

(51) Int. Cl.$^7$ .................................................. H02J 7/04
(52) U.S. Cl. ....................................................... 320/152
(58) Field of Search ................................ 320/112, 116, 320/132, 156, 152, 149, 153, 161, 162, 134, DIG. 21

(56) References Cited

U.S. PATENT DOCUMENTS

| | | | |
|---|---|---|---|
| 6,358,180 B1 * | 8/2000 | Kuroda et al. | 477/4 |
| 6,234,932 B1 * | 5/2001 | Kuroda et al. | 477/3 |
| 6,344,728 B1 * | 2/2002 | Kouzu et al. | 320/116 |

FOREIGN PATENT DOCUMENTS

| | | | |
|---|---|---|---|
| DE | 4200693 | * | 5/1993 |
| EP | 964 470 | | 12/1999 |
| JP | 11-111349 | | 4/1999 |

* cited by examiner

*Primary Examiner*—Edward H. Tso
*Assistant Examiner*—Pia Tibbits
(74) *Attorney, Agent, or Firm*—Merchant & Gould P.C.

(57) ABSTRACT

A device and method of input/output control capable of exhibiting the battery performance by nature by rapidly raising the temperature of the secondary battery by the regeneration at a low temperature. A temperature rise controller controls the temperature rise of the battery pack based on the battery temperature, thereby determining a central value of the state-of-charge control in the range of the state of charge. A battery input/output controller voluntarily controls the state of charge based on the central value of the state-of-charge control from the temperature rise controller and the state of charge at the point of time from the state-of-charge operator, and controls charge and discharge based on the charge and discharge request from the outside to the battery pack.

15 Claims, 10 Drawing Sheets

DEVICE AND METHOD FOR CONTROLLING INPUT/OUTPUT OF SECONDARY BATTERY

BACKGROUND OF THE INVENTION

1. Field of the Invention

The present invention relates to a technique for regenerating a secondary battery at a low temperature, particularly to a technique for improving the power performance of a vehicle such as a pure electric vehicle or a hybrid electric vehicle during start-up and during driving in an environment of a low temperature by controlling the charge and discharge of the secondary battery.

2. Related Background Art

Examples of the secondary battery include lead batteries, nickel-cadmium (Ni-Cd) batteries, nickel-metal-hydride (Ni-MH) batteries, and lithium ion batteries, etc. Such batteries have a characteristic in that they are connected to an external power source and thereby they can be charged with a predetermined current applied from the power source when their electric power is consumed. These batteries conventionally have been used for various equipment, using such a characteristic.

For example, such a battery is mounted on a vehicle and functions as a battery for starting an engine that supplies electric power to an ignition plug of its engine during start-up. Recently, Ni-MH battery is used also as a main power source for driving a pure electric vehicle or a so-called hybrid electric vehicle provided with an engine and the electric motor.

In the hybrid electric vehicle, when the output from the engine is larger than the power necessary for driving, the secondary battery is charged by driving an electric generator, making use of the excess power. On the contrary, when the output from an engine is smaller, the electric motor is driven by the use of the power of the secondary battery so as to supply the shortage of power. In this case, discharging of the secondary battery is carried out. When the secondary battery is mounted on the hybrid electric vehicle the vehicle is required to maintain the secondary battery in an appropriate operation condition by controlling the charge and discharge of the second battery.

Therefore, the state of charge (SOC) of the battery is estimated by detecting the voltage, current, temperature, etc., of the battery, and the SOC is controlled so that the fuel consumption efficiency becomes the best. Furthermore, in order to operate the power assist driven by the electric motor during acceleration and energy collection (regenerative braking) during deceleration with a good balance, the SOC level at this time is set to be, for example, approximately 50 to 60% as the center of control. When the SOC becomes lower than the center, this battery is controlled to be charged excessively, and on the contrary, when the SOC is higher than the center, the battery is controlled to be discharged excessively so as to bring the SOC to the center of control.

In general, when the secondary battery is at a low temperature, as compared with an ordinary operating temperature, the activation level within the battery is thought to be lowered. When the output is the same, the voltage of the secondary battery is greatly lowered. Therefore, the output duration is also shorter, thus remarkably reducing the electric power taken from the battery. On the contrary, when the charge is carried out when the battery temperature is low, since the battery voltage is increased greatly, overvoltage occurs at the side of the electric motor system, making a long-time charging impossible.

When the secondary battery is used as a power source to start the engine when the battery temperature is low, at which time the battery performance remarkably is deteriorated, the lowering of the battery voltage is increased. Therefore, every time a driver turns on a starter, the battery voltage is suddenly lowered, making it difficult to start the engine.

Furthermore, when driving a vehicle when the battery temperature is low, input/output of the battery becomes small, and sufficient power assist during acceleration and the energy collection during deceleration are impossible. Thus, under such circumstances, as a state in which the battery temperature is low lasts for a long time, energy collection efficiency is lowered due to the reduction of battery input. That is, deterioration of fuel efficiency, as well as deterioration of motor performance such as acceleration force, and ability to climb a slope, of a vehicle due to shortage of battery output may occur and serious problems such as stopping on the road may occur.

SUMMARY OF THE INVENTION

With the foregoing in mind, it is an object of the present invention to provide a device and method for controlling charge and discharge, which can exhibit the battery performance achieving its intended level of a battery by quickly raising the temperature of the battery or increasing the battery voltage by regenerating the battery when it is at a low temperature and can start the engine quickly at a low temperature.

In order to achieve the above-mentioned object, a first input/output control device of a secondary battery according to the present invention includes: a battery pack in which a plurality of cells that are secondary batteries are combined with each other; a voltage detector for detecting an output voltage of the battery pack; a current detector for detecting a charge/discharge current of the battery pack; a temperature detector for detecting the temperature within the battery pack; a state-of-charge operator for calculating the state of charge of the battery pack based on a voltage signal from the voltage detector, a current signal from the current detector, and a temperature signal from the temperature detector; a temperature rise controller for determining a central value of the state-of-charge control in the range of the state-of-charge control of the battery pack in order to control the temperature rise of the battery pack based on the temperature signal, and then outputting the central value of the state-of-charge control; and a battery input/output controller for voluntarily controlling the state of charge of the battery pack based on the central value of the state-of-charge control from the temperature rise controller and the state of charge at the point of time from the state-of-charge operator, and for controlling the charge and discharge of the battery pack based on charge and discharge requests from the outside to the battery pack.

It is preferable in the first input/output control device that when a temperature indicated by the temperature signal is lower than a predetermined temperature, the temperature rise controller allows the central value of the state-of-charge control to shift toward an upper region in the range of the state-of-charge control in corresponding to the temperature indicated by the temperature signal.

Furthermore, it is preferable in the first input/output control device that the battery input/output controller carries out a short-time charging of the battery pack after the discharge request from the outside to the battery pack is canceled.

Alternatively, it is preferable in the first input/output control device that the battery input/output controller carries out a short-time charging of the battery pack if a voltage value indicated by the voltage signal from the voltage detector becomes lower than a predetermined voltage when the output control of the battery pack is carried out based on the discharge request from the outside to the battery pack.

In order to achieve the above-mentioned object, a second input/output control device of the secondary battery according to the present invention includes: a battery pack being mounted on a vehicle provided with an electric motor and an electric generator, in which the electric motor is used as a driving source; the battery pack including a plurality of cells that are secondary batteries combined with each other and having positive and negative poles connected to the vehicle; a voltage detector for detecting an output voltage of the battery pack; a current detector for detecting a charge/discharge current of the battery pack; a temperature detector for detecting the temperature within the battery pack; a state-of-charge operator for calculating the state of charge of the battery pack based on a voltage signal from the voltage detector, a current signal from the current detector, and a temperature signal from the temperature detector; a temperature rise controller for determining a central value of the state-of-charge control in a range of the state-of-charge control of the battery pack in order to control the temperature rise of the battery pack based on the temperature signal, and then outputting the central value of the state-of-charge control; and a battery input/output controller for voluntarily controlling the state of charge of the battery pack based on the central value of the state-of-charge control from the temperature rise controller and the state of charge at the point of time from the state-of-charge operator, and for controlling the charge and discharge of the battery pack based on charge and discharge requests commanded by a driver to the battery pack.

It is preferable in the second input/output control device that when a temperature indicated by the temperature signal is lower than a predetermined temperature, the temperature rise controller allows the central value of the state-of-charge control to shift toward an upper region in the range of the state-of-charge control in corresponding to the temperature indicated by the temperature signal.

Furthermore, it is preferable in the second input/output control device that the battery input/output controller carries out a short-time charging of the battery pack after the discharge request commanded by the driver to the battery pack is canceled.

Alternatively, it is preferable that the battery input/output controller carries out a short-time charging of the battery pack if the voltage value indicated by the voltage signal from the voltage detector becomes lower than a predetermined voltage when the output control of the battery pack is carried out based on the discharge request commanded by the driver to the battery pack.

In order to achieve the above-mentioned object, an input/output control method of the secondary battery according to the present invention includes: detecting an output voltage, a charge/discharge current, and a temperature of a battery pack in which a plurality of cells that are secondary batteries are combined with each other; calculating a state of charge of the battery pack based on the detected output voltage, charge/discharge current and temperature; setting a central value of the state-of-charge control in a range of the state-of-charge control in an upper region in the range of the state-of-charge control when the detected temperature becomes lower than a predetermined temperature; determining a difference between the calculated state of charge and the set central value of the state-of-charge control, and carrying out the charging of the battery pack based on the difference to control the temperature rise of the battery pack.

It is preferable in the input/output control method of the secondary battery that a short-time charging of the battery pack is carried out after a discharge request to the battery pack is canceled.

Alternatively, it is preferable that a short-time charging of the battery pack is carried out if the detected output voltage becomes lower than a predetermined voltage when discharging of the battery pack is carried out based on a discharge request to the battery pack.

In order to achieve the above-mentioned object, a third input/output control device of a secondary battery according to the present invention includes: a battery pack being mounted on a vehicle provided with an electric motor and an electric generator, in which the electric motor or an engine is used as a driving source, the battery pack including a plurality of cells that are secondary batteries combined with each other and having positive and negative poles connected to the vehicle; a voltage detector for detecting an output voltage of the battery pack; a current detector for detecting a charge/discharge current of the battery pack; a temperature detector for detecting the temperature within the battery pack; a rotational speed detector for detecting the rotational speed of the engine, and a battery input/output controller for judging whether the start-up of the engine fails based on a voltage signal from the voltage detector, a current signal from the current detector, a temperature signal from the temperature detector, and a rotational speed signal from the rotational speed detector.

It is preferable in the third input/output control device that the battery pack is used as a power source to start the start-up of the engine when an output of a start-up command from a driver is issued, and the start-up of the engine is stopped when the voltage value indicated by the voltage signal from the voltage detector of the battery pack becomes lower than a predetermined value, or the rotational speed signal from the rotational speed detector becomes lower than a predetermined rotational speed.

Furthermore, it is preferable in the third input/output control device that after the start-up of the engine is stopped, the battery input/output controller carries out a short-time charging of the battery pack by means of an external charger or the like, and thereafter carrying out a start-up of the engine again.

Furthermore, it is preferable in the third input/output control device that after the start-up of the engine is stopped, the battery input/output controller carries out a regeneration with respect to the battery pack by the revolving of the engine, and thereafter carrying out a start-up of the engine again.

According to the above-mentioned configuration and method, when the battery temperature is low, by setting a central value of the state-of-charge (SOC) control to the upper region in a range of the control by means of software, the frequency of charging in the region in which the charging efficiency is deteriorated becomes higher, so that the reaction heat by charging can increase the battery temperature quickly, thus making the most of the battery performance. Consequently, serious problems such as the deterioration of a motor performance of a vehicle, stopping on the road, etc. can be avoided, thus improving the marketability as a vehicle. Furthermore, since software control can be employed, no hardware is added, and thus, the cost of the device is not increased.

Furthermore, a control is carried out so that a short-time charging is carried out after the battery discharge request is cancelled, since the battery voltage, which was lowered by discharging, can be increased quickly, the subsequent battery output performance can be improved, thus also making it possible to enhance the marketability as a vehicle.

Furthermore, in a vehicle using a secondary battery for start-up of the engine as a power source, by carrying out a short-time charging when the engine is started up at a low temperature, after a battery discharge is carried out by the operation of a starter and the discharge is stopped because it is judged that the start-up of the engine is difficult by the battery input/output controller, the battery voltage can be increased. At the same time, since the crank shaft of engine is revolved by a first operation of the starter, it is possible to lower the viscosity of engine oil, thus making it possible to start up the vehicle at a low temperature the second time or later by the inertial revolution of the crankshaft.

DETAILED DESCRIPTION OF THE INVENTION

Hereinafter, preferred Embodiments of the present invention are described with reference to suitable drawings.
First Embodiment FIG. 1 is a block diagram showing a configuration of an input/output control device of a secondary battery according to a first embodiment of the present invention.

Figure 1:
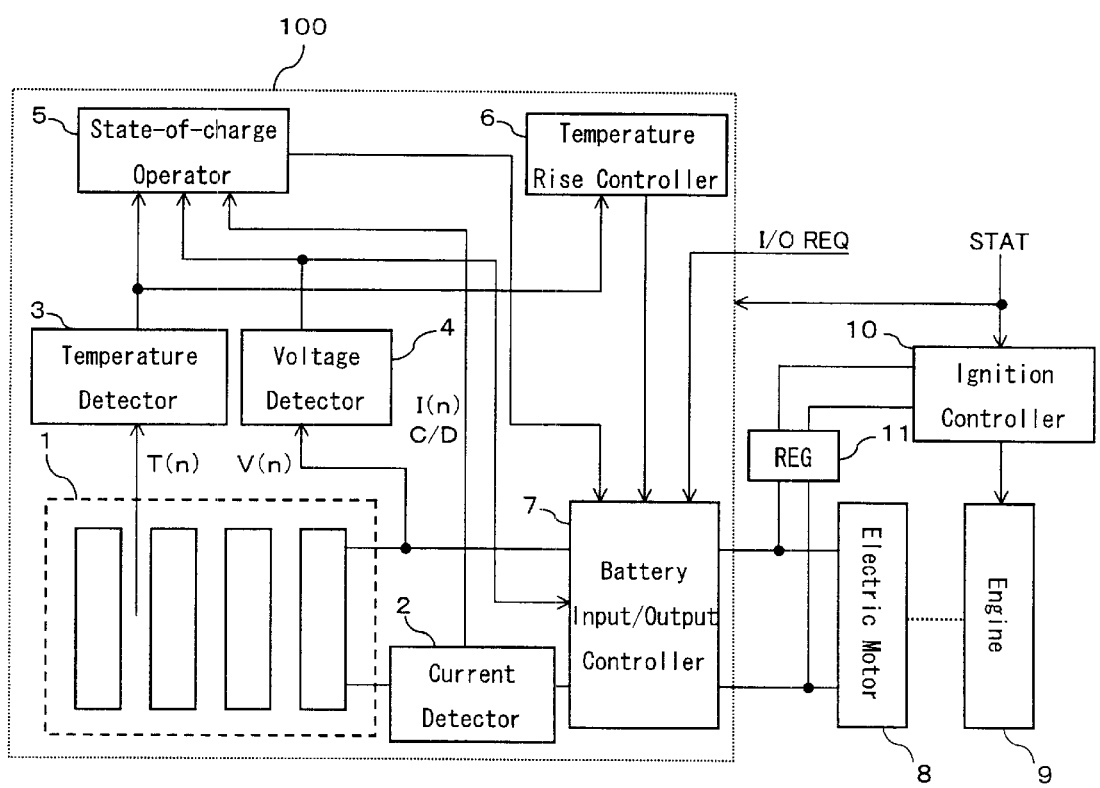
FIG. 1 is a block diagram showing a configuration of an input/output control device of a secondary battery according to a first embodiment of the present invention.

In FIG. 1, numeral 1 denotes a battery pack composed of secondary batteries, for example, a nickel-hydrogen battery to be mounted on a hybrid electric vehicle. Generally, this battery pack 1 is composed by electrically connecting a plurality of battery modules in series in order to obtain a predetermined output for a motor 8. Each battery module is a nickel-hydrogen battery composed of a plurality of cells electrically connected in series.

Numeral 2 is a current detector disposed between a minus output terminal of the battery pack 1 and a minus input terminal of the electric motor 8. This samples a charge/discharge current of the secondary battery 1 output from a current sensor (not shown in the figure) per predetermined time to obtain a current sample I(n) and thus detects the magnitude of the current and at the same time detects whether the current is a charge current or a discharge current, i.e., a charge/discharge direction (C/D) based on the sign of the current sample I(n).

Numeral 3 denotes a temperature detector. This samples a battery temperature output from a temperature sensor (not shown in the figure) disposed in a predetermined position within the battery pack 1 per predetermined time to obtain a temperature sample T(n).

Numeral 4 is a voltage detector. This samples an output voltage of the battery pack 1 per predetermined time to obtain a voltage sample V(n) per cell.

The current sample I(n) and charge/discharge direction C/D from the current detector 2, the temperature sample T(n) from the temperature detector 3, and the voltage sample V(n) from the voltage detector 4 are fed to a state-of-charge (SOC) operator 5. Thus, the state of charge of the battery pack 1 is calculated and determined.

Figure 3:
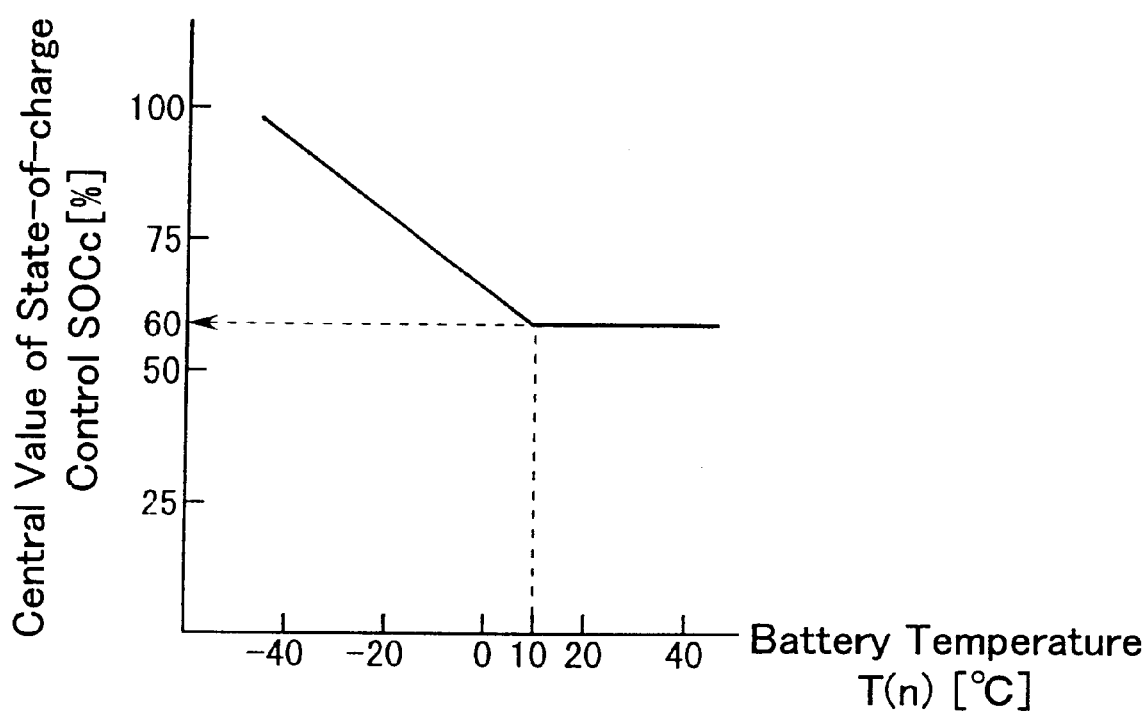
FIG. 3 is a graph showing a curve of a central value of the state of charge SOCc to be set with respect to a battery temperature T(n) in the first embodiment of the present invention.

Numeral 6 denotes a temperature rise controller. This determines a central value of the state-of-charge control SOCc in the state-of-charge control range of the battery pack 1 in order to control the temperature rise of the battery pack 1 based on the temperature sample T(n) from the temperature detector 3 and feeds it to a below mentioned battery input/output controller 7. As shown in FIG. 3, the central value of state-of-charge control SOCc is constant (for example, 60%) when the battery temperature indicated by the temperature sample (n) is higher than a predetermined temperature, and is determined as a value that increases in accordance with the decrease of the battery temperature when T(n) is lower than a predetermined temperature (for example 10° C.). The characteristic curve of a central value of state of charge SOCc with respect to the battery temperature (the temperature sample) T(n) (shown in FIG. 3) is stored in a look up table (LUT) composed of, for example, a memory.

Figure 5:
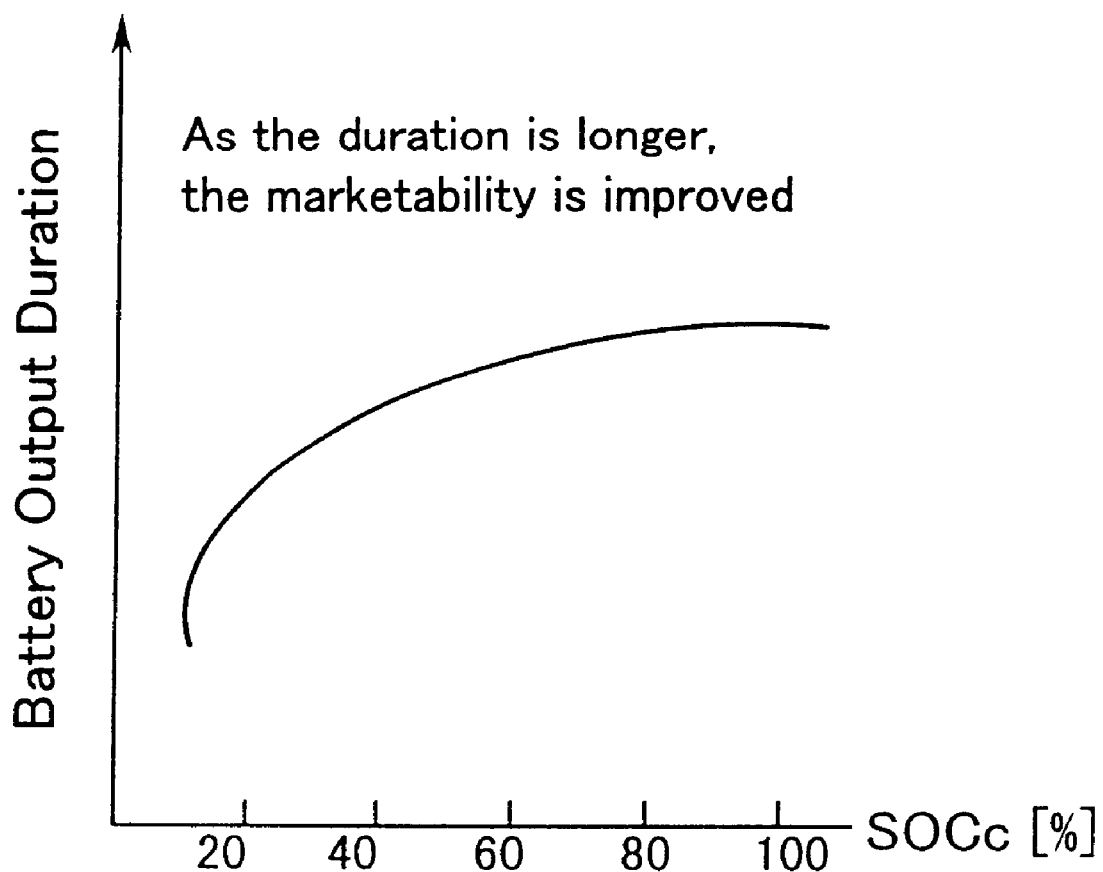
FIG. 5 is a graph showing a curve of a battery output with respect to the central value of the state of charge SOCc in the first embodiment of the present invention.
Figure 6:
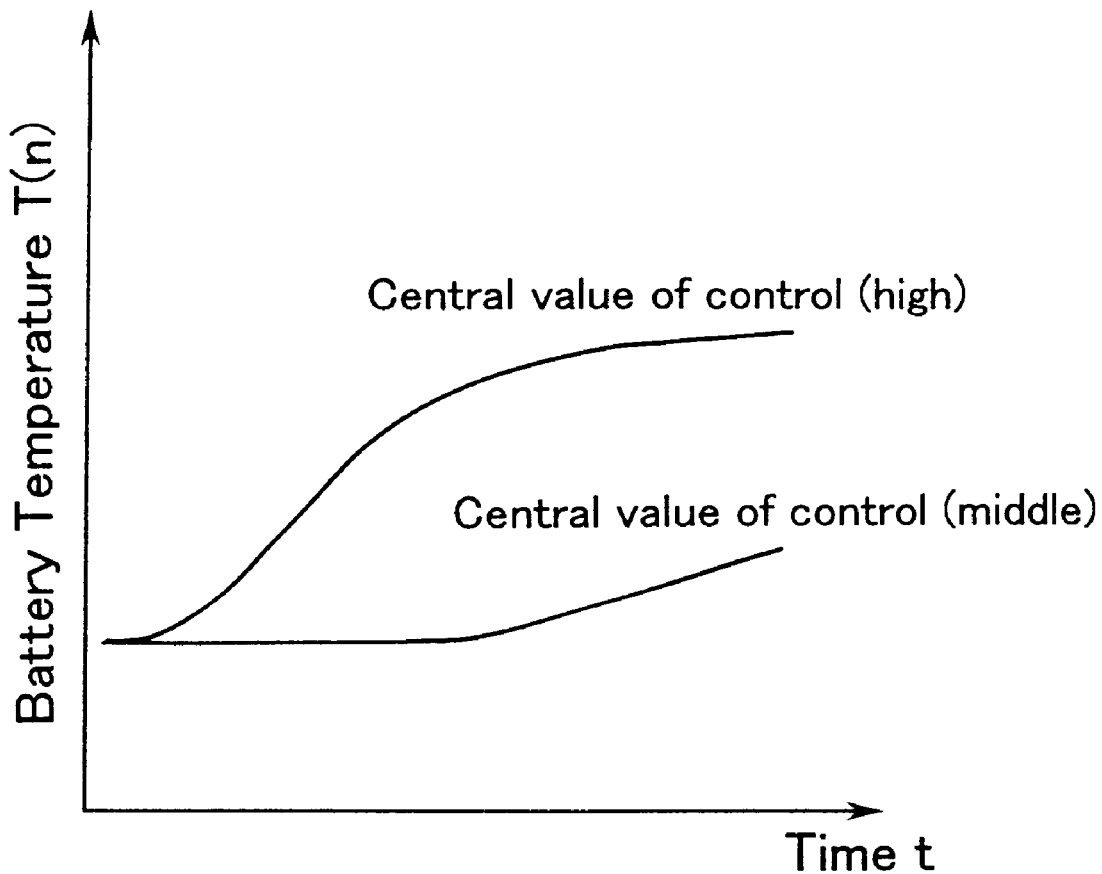
FIG. 6 is a graph showing curves of the rise of the battery temperature T(n) in the cases of high and middle values of the state-of-charge control SOCc in the first embodiment of the present invention.

Numeral 7 denotes a battery input/output controller. This controls a state of charge of the battery by the difference between the state-of-charge level calculated at the point of time by the state-of-charge operator 5 and the central value of the state-of-charge control SOCc determined by the temperature rise controller 6. At a low temperature, the central value of state-of-charge control SOCc may be previously set in an upper region in which there is poor charging efficiency in the range of the used capacity by the temperature rise controller 6, and the battery temperature can therefore be increased to achieve an intended battery performance level. FIGS. 5 and 6 show a continuous output time of the battery with respect to the central value of the state of charge SOCc, and a battery temperature with respect to the elapsed time in the cases where the central value of this state-of-charge control SOCc is high and middle, respectively.

Furthermore, the battery input/output controller 7 controls the charge amount and discharge amount with respect to the battery pack 1 in order to carry out a power assist and a regenerative braking of the engine 9 corresponding to a battery input/output request (I/O REQ) from a driver, for example, acceleration and deceleration operations. When the input/output request from the driver is a battery output request for acceleration of a vehicle or for climbing a slope, the battery input/output section 7 can improve the subsequent output performance by carrying out a short-time charging for the battery pack 1 so as to rapidly increase the battery voltage that was lowered due to discharge after the output request is canceled.

Figure 4:
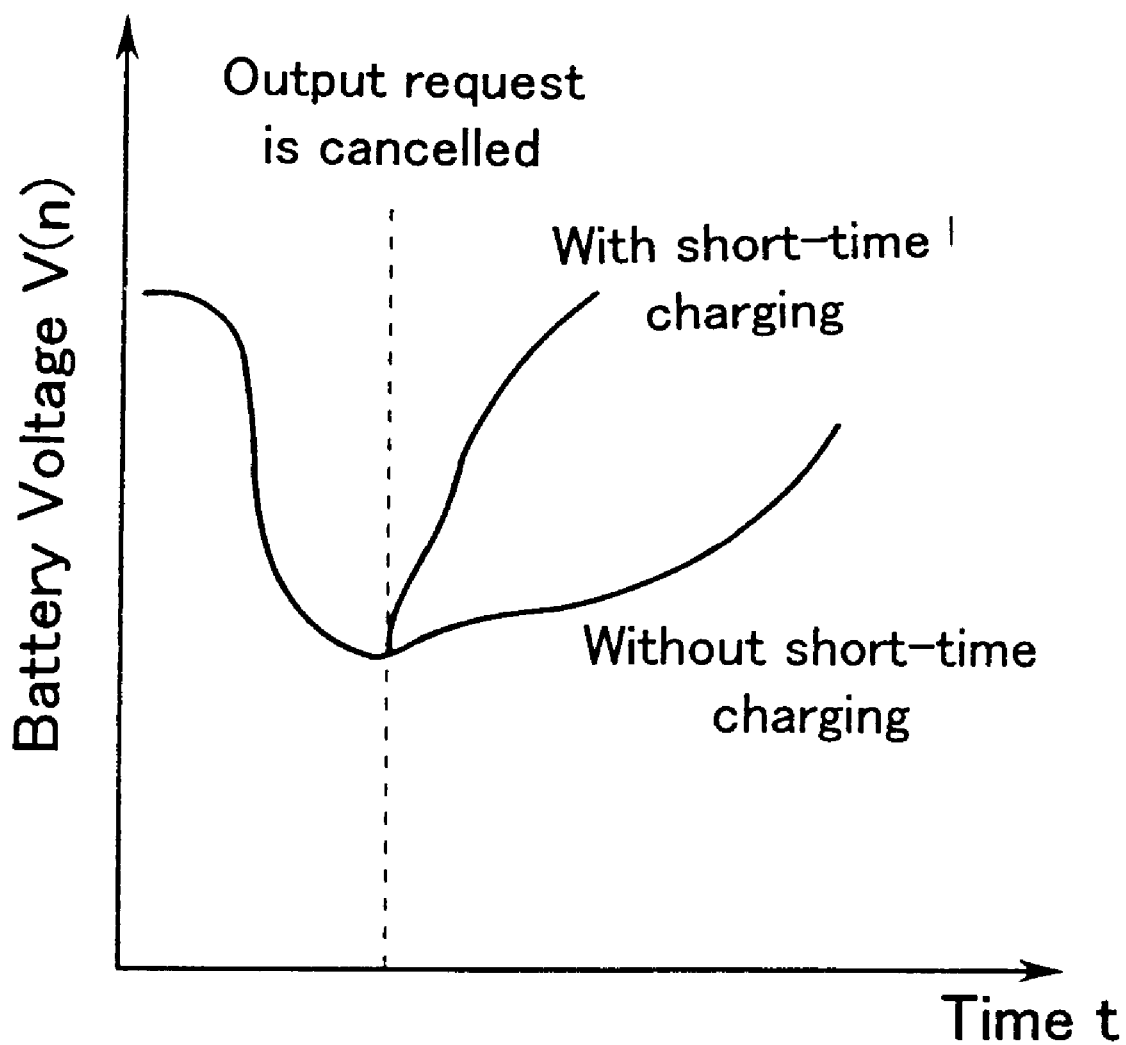
FIG. 4 is a graph showing a change of the battery voltage V(n) at the time of the output request in the first embodiment of the present invention.

FIG. 4 shows a change of the battery voltage in a case where the short time charging is carried out and the short-time charging is not carried out after the output request is made so as to lower the battery voltage, and the output request is cancelled. As is apparent from FIG. 4, when the short-time charging is carried out (for example, several amperes of current is applied for several seconds) after the output request is canceled, the increase rate of the battery voltage becomes higher.

Next, a control process in the first embodiment having such a configuration is described with reference to FIG. 2.

Figure 2:
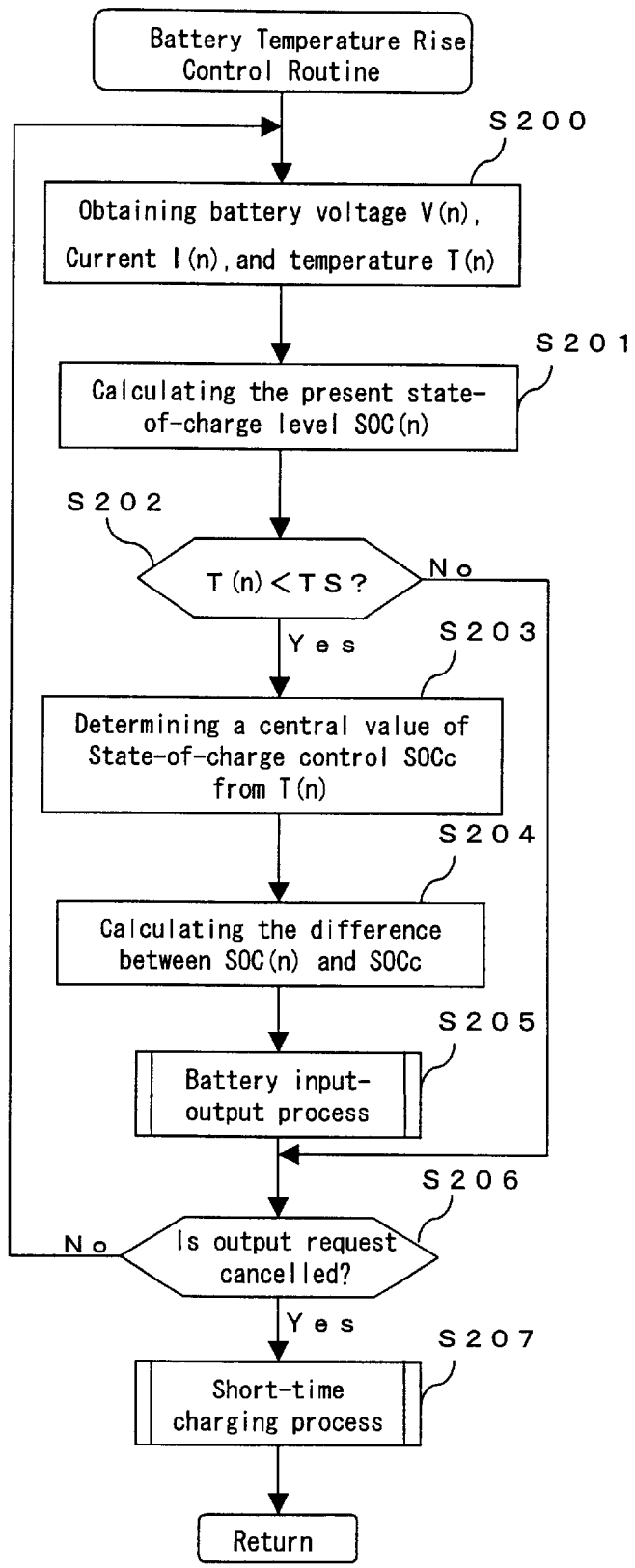
FIG. 2 is a flow chart showing a battery temperature rise control routine according to the first embodiment of the present invention.

FIG. 2 is a flow chart showing a battery temperature rise control routine according to the first embodiment of the present invention. Herein, when the battery temperature is lower than a predetermined value, if the output request is made from a driver, and then the battery temperature rise control routine shown in FIG. 2 starts.

In FIG. 2, first, battery voltage V(n), current I(n), and temperature T(n) are obtained per predetermined sampling time (S200). Based on the obtained battery voltage V(n), current I(n), and temperature T(n), the actual state-of-charge level SOC(n) of the battery pack 1 at the point of time is calculated (S201).

Next, whether or not the battery temperature T(n) is lower than a predetermined temperature TS (for example, 10° C.) is determined (S202). Herein, since the temperature rise control is not yet carried out, the battery temperature T(n) is lower than the predetermined temperature (TS). In a subsequent step S203, the central value of the state-of-charge control SOCc is calculated from the obtained battery temperature T(n). Next, the difference between the state-of-charge level SOC(n) at the point of time calculated at the step S201 and the central value of state-of-charge control SOCc calculated at the step 203 is calculated (S204), and the battery input/output control is carried out based on the difference (S205). Herein, the central value of state-of-charge control SOCc is set to be in an upper region side in which there is poor charging efficiency in the range of the used capacity and charging is carried out with respect to the battery pack 1 by a regenerative braking. Thus, the battery temperature is increased.

Next, at the step S206, whether or not the output request from the driver is canceled is judged. As a result of this judgement, if the output request is not yet canceled, the processes from the step S200 to S205 are continued. While a series of these processes are carried out, the central value of state-of-charge control SOCc, which is calculated at the step 203 in corresponding to the increase in the battery temperature, is lowered gradually toward the initial set value.

When the battery temperature T(n) is increased to the predetermined temperature TS or more due to the input/output control of the battery at the step S205, as a judgement at the step S202, obtaining of various data (voltage, current, temperature) at the step S200 and the state-of-charge level SOC(n) at the point of time at the step S201 are continued.

This is because the range of the state of charge is controlled to the value in the predetermined range (for example, 40 to 70%) in the other routine.

If the output request is canceled as a result of the judgement at the step S206, the process proceeds to the step S207. At the step S207, a short-time charging process is carried out with respect to the battery pack 1 and the battery temperature rise control routine is finished. Thus, it is possible rapidly to increase the battery voltage that was lowered while the output request is continued.

Second Embodiment

Next, a second embodiment of the present invention is described with reference to FIGS. 7, 8, 9 and 10.

Figure 7:
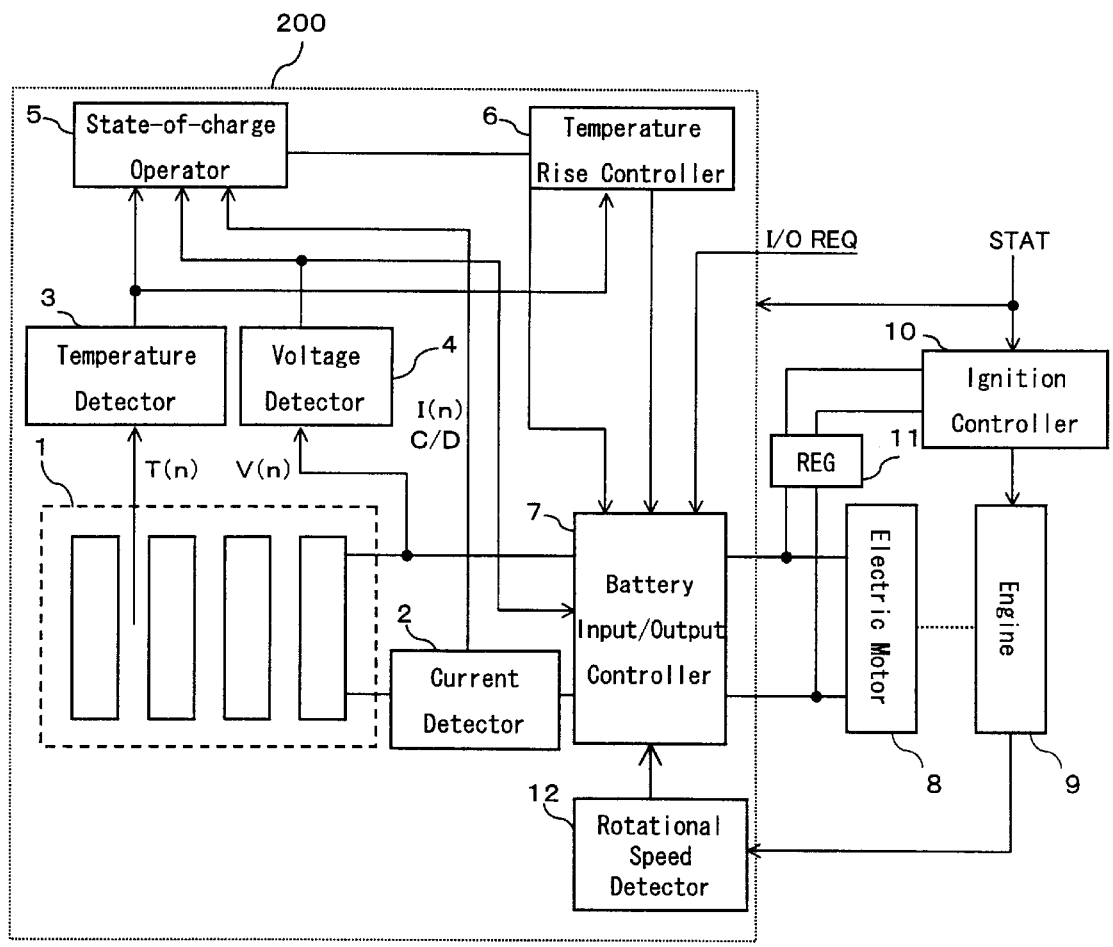
FIG. 7 is a block diagram showing a configuration of an input/output control device of a secondary battery according to a second embodiment of the present invention.

FIG. 7 is a block diagram showing a configuration of an input/output control device of the secondary battery according to a second embodiment of the present invention.

Figure 8:
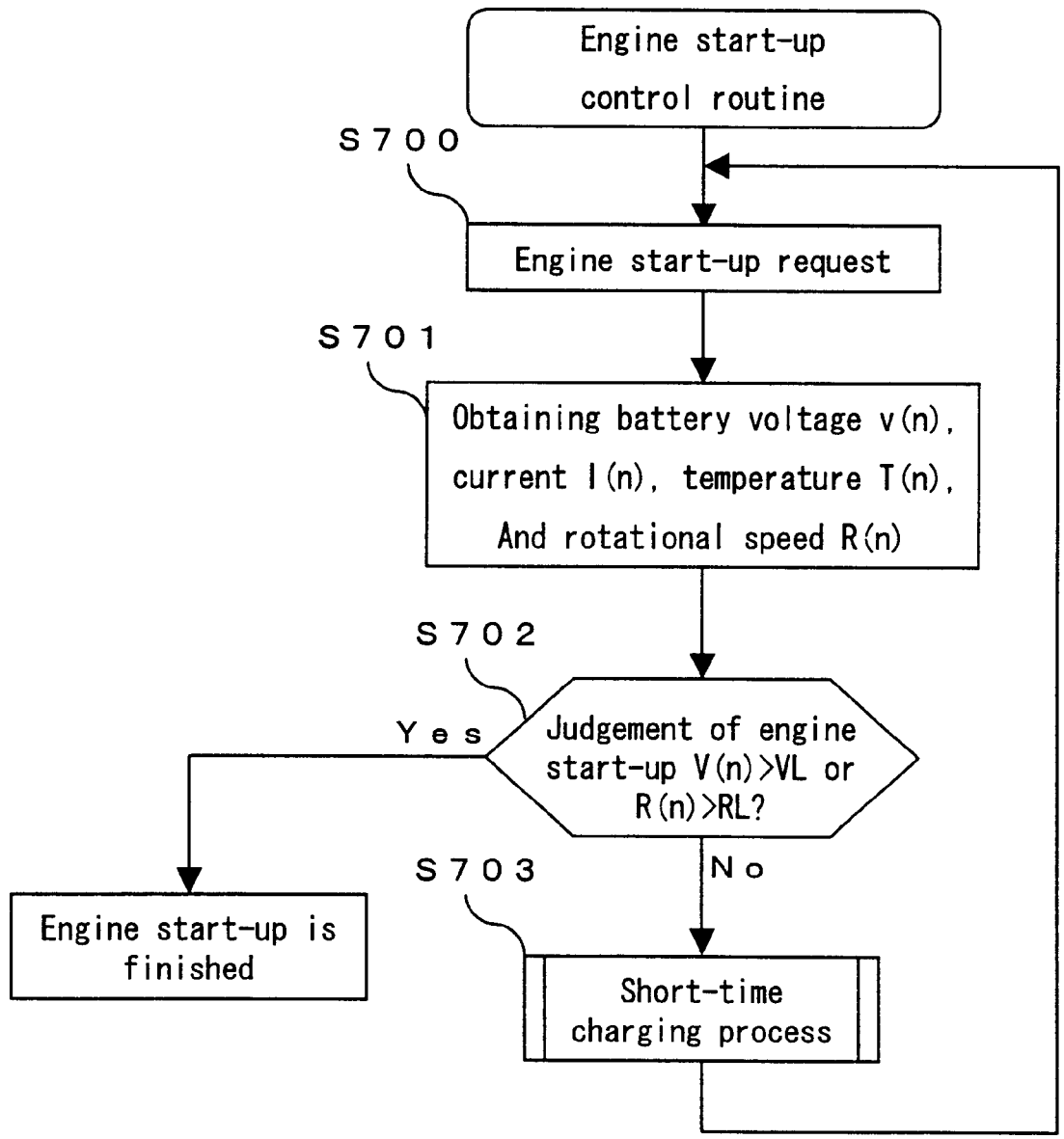
FIG. 8 is a flow chart showing an engine starting control routine according to the second embodiment of the present invention.

FIG. 8 is a flow chart showing an engine start-up control routine according to the second embodiment of the present invention. This engine start-up control routine of this embodiment relates to a control for facilitating the start-up of the engine at a low temperature by using the battery pack 1 as a power source for start-up of the engine. Hereinafter, only steps different from the first embodiment are described and the same steps are provided with the same remarks and the explanation therefor is not repeated herein.

Figure 9:
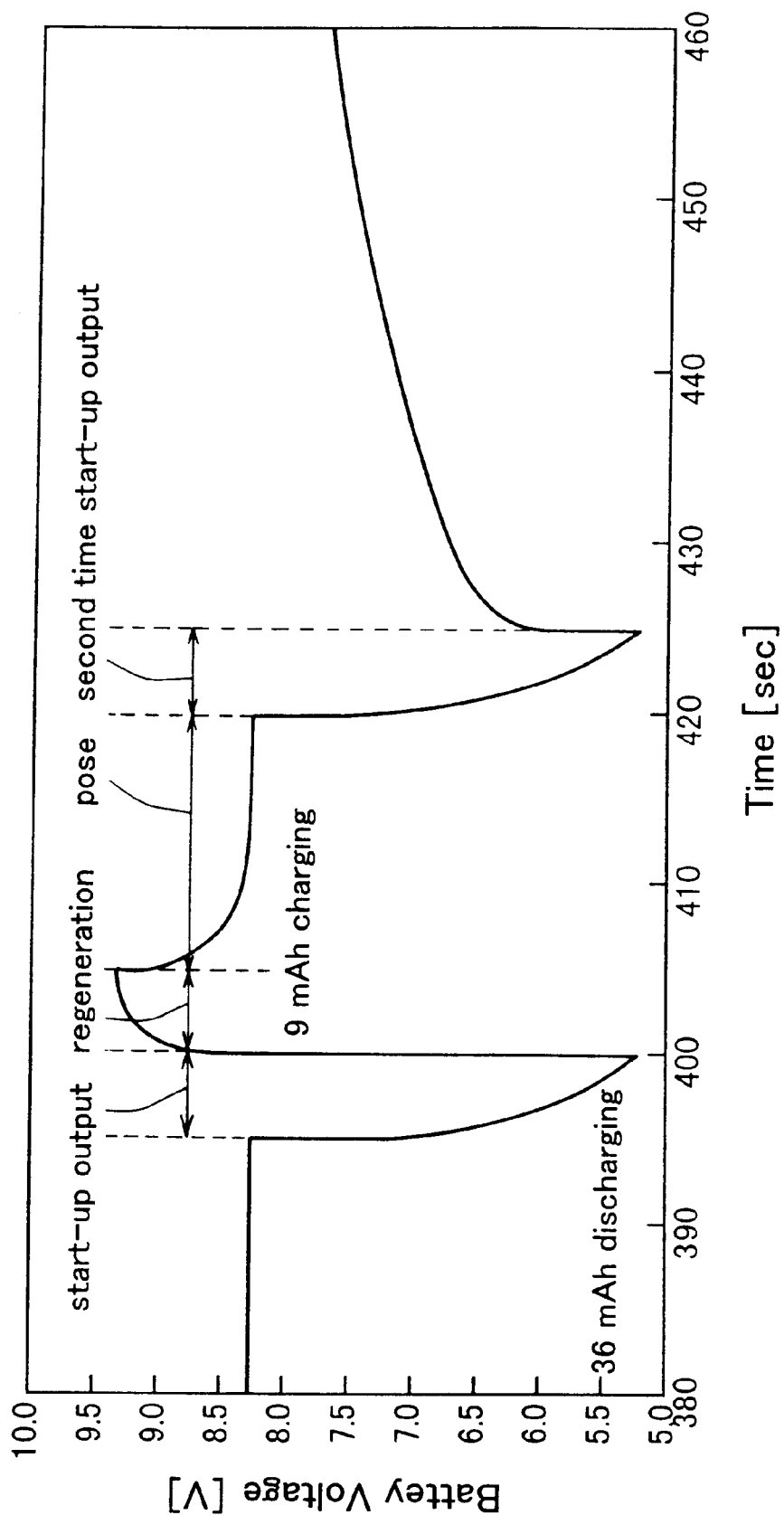
FIG. 9 is a graph showing a curve of battery voltage with respect to elapsed time in the second embodiment of the present invention.

FIG. 9 is a graph showing a curve of the battery voltage with respect to elapsed time according to the second embodiment.

Figure 10:
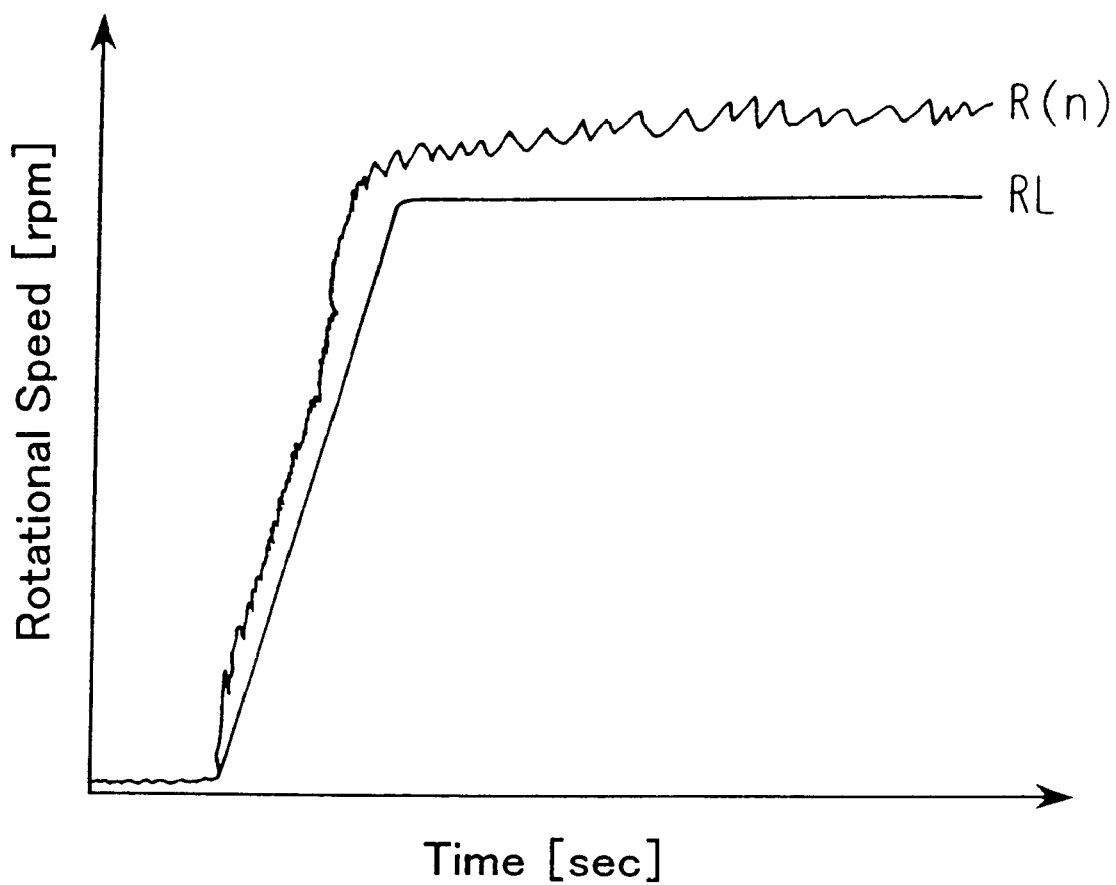
FIG. 10 is a graph showing a curve of the rotational speed of an engine with respect to elapsed time in the second embodiment of the present invention.

FIG. 10 is a graph showing curves of the rotational speed of the engine with respect to elapsed time according to the second embodiment.

In FIG. 7, an input/output controller 7 supplies the output from the battery pack 1, which is regulated to a predetermined level via a voltage regulator (REG) 11, to an ignition controller 10. During start-up of a vehicle, when a starter signal is on corresponding to the starter signal (STAT) from a driver, the battery pack 1 is at a low temperature. Therefore, when a voltage sample V(n) from the voltage detector 4 is lower than a predetermined battery protection voltage (a voltage that does not damage the battery), or a rotational speed sample R(n) from the engine rotational speed detector 12 is lower than a predetermined rotational speed, the battery input/output controller 7 stops supplying battery output to the ignition controller 10 and carries out a short-time charging with respect to the battery pack 1 by using, for example, an auxiliary battery or an external charger, etc. (not shown in the figure), or carries out a short-time charging with respect to the battery pack 1 by using an electric motor 8 connected via a crank shaft (not shown in the figure) of the engine 9 as an electric generator by means of an inertial rotation of the crank shaft.

Next, an engine start-up control process in the second embodiment having such a configuration is described with reference to FIG. 8.

In FIG. 8, an engine start-up request is made from a driver (at the step S700), and a battery voltage V(n), a current I(n), a temperature T(n) and an engine rotational speed R(n) are obtained per predetermined sampling time (S701). Based on the battery voltage V(n) and the engine rotational speed R(n), from the predetermined judgement reference VL (the lowest voltage) and RL (the lowest engine rotational speed), the engine starting is judged (S702). As a result of the judgement at the step 702, if a battery voltage V(n) is lower than the predetermined battery voltage (the lowest voltage VL: for example, about 5.3 V in FIG. 9), or the engine rotational speed R(n) is lower than the predetermined engine rotational speed (the lowest rotational speed RL shown in FIG. 10), the battery output to the ignition controller 10 is stopped, and a short-time charging by an auxiliary battery or an external charger etc., or a short-time charging by the regenerating process is carried out (S703).

The battery voltage that was rapidly lowered can be recovered for a short time by the short-time charging and even upon stopping the first time start-up of the engine (or failing to start up the engine), it becomes easy to start up the engine second time or later by the help of the decrease in viscosity of engine oil due to the revolving of the crank shaft at that time.

Moreover, in the embodiments of the present invention, the case wherein a short-time charging is carried out so as to start up the engine again when the battery temperature is lower than the predetermined temperature (for example, 10° C.) is described. However, in order to protect the battery as a priority, it is possible to employ a configuration in which electronic control is carried out instead of the starter operation that is carried out manually by a driver.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An input/output control device of a secondary battery, comprising:
   a battery pack in which a plurality of cells that are secondary batteries are combined with each other;
   a voltage detector for detecting an output voltage of the battery pack;
   a current detector for detecting a charge/discharge current of the battery pack;
   a temperature detector for detecting the temperature within the battery pack;
   a state-of-discharge operator for calculating a state of charge of the battery pack based on a voltage signal from the voltage detector, a current signal from the current detector, and a temperature signal from the temperature detector;
   a temperature rise controller for determining a central value of the state-of-charge control in the range of the state-of-charge control of the battery pack in order to control the temperature rise of the battery pack based on the temperature signal, and then outputting the central value of the state-of-charge control; and
   a battery input/output controller for controlling the state of charge of the battery pack based on the central value of the state-of-charge control from the temperature rise controller and the state of charge at the point of time from the state-of-charge operator, and for controlling the charge and discharge of the battery pack based on charge and discharge requests from the outside to the battery pack.

2. The input/output control device of the secondary battery according to claim 1 wherein when a temperature indicated by the temperature signal is lower than a predetermined temperature, the temperature rise controller allows the central value of the state-of-charge control to shift toward an upper region in a range of the state-of-charge control corresponding to the temperatures indicated by the temperature signal.

3. The input/output control device of a secondary battery according to claim 1, wherein the battery input/output controller carries out a short-time charging of the battery pack after the discharge request from the outside to the battery pack is canceled.

4. The input/output control device of a secondary battery according to claim 1, wherein the battery input/output controller carries out a short-time charging of the battery pack if a voltage value indicated by the voltage signal from the voltage detector becomes lower than a predetermined voltage when the output control of the battery pack is carried out based on the discharge request from the outside to the battery pack.

5. An input/output control device of a secondary battery, comprising:
   a battery pack being mounted on a vehicle provided with an electric motor and an electric generator, in which the electric motor is used as a driving source; the battery pack including a plurality of cells that are secondary batteries combined with each other; and having positive and negative poles connected to the vehicle;
   a voltage detector for detecting an output voltage of the battery pack;
   a current detector for detecting a charge/discharge current of the battery pack;
   a temperature detector for detecting the temperature within the battery pack;
   a state-of-charge operator for calculating a state of charge of the battery pack based on a voltage signal from the voltage detector, a current signal from the current detector, and a temperature signal from the temperature detector;
   a temperature rise controller for determining a central value of the state-of-charge control in a range of the state-of-charge control of the battery pack in order to control the temperature rise of the battery pack based on the temperature signal, and then outputting the central value of the state-of-charge control; and
   a battery input/output controller for controlling the state of charge of the battery pack based on the central value of the state-of-charge control from the temperature rise controller and the state of charge at the point of time from the state-of-charge operator, and for controlling the charge and discharge of the battery pack based on charge and discharge requests commanded by a driver to the battery pack.

6. The input/output control device of the secondary battery according to claim 5, wherein when a temperature indicated by the temperature signal is lower than a predetermined temperature, the temperature rise controller allows the central value of the state-of-charge control to shift toward an upper region in the range of the state-of-charge control in corresponding to the temperatures indicated by the temperature signal.

7. The input/output control device of the secondary battery according to claim 5, wherein the battery input/output controller carries out a short-time charging of the battery pack after the discharge request commanded by the driver to the battery pack is canceled.

8. The input/output control device of the secondary battery according to claim 5, wherein the battery input/output controller carries out a short-time charging of the battery pack if the voltage value indicated by the voltage signal from the voltage detector becomes lower than a predetermined voltage when the output control of the battery pack is carried out based on the discharge request commanded by the driver to the battery pack.

9. An input/output control method of a secondary battery, comprising:

detecting an output voltage, a charge/discharge current, and a temperature of a battery pack in which a plurality of cells that are secondary batteries are combined with each other;

calculating a state of charge of the battery pack based on the detected output voltage, charge/discharge current and temperature;

setting a central value of the state-of-charge control in an upper region in the range of the state-of-charge control when the detected temperature becomes lower than a predetermined temperature;

determining a difference between the calculated state of charge and the set central value of the state-of-charge control, and carrying out the charging of the battery pack based on the difference to control the temperature rise of the battery pack.

10. The input/output control method of the secondary battery according to claim 9, wherein a short-time charging of the battery pack is carried out after a discharge request to the battery pack is canceled.

11. The input/output control method of the secondary battery according to claim 9, wherein a short-time charging of the battery pack is carried out if the detected output voltage becomes lower than a predetermined voltage when discharging of the battery pack is carried out based on a discharge request to the battery pack.

12. An input/output control device of a secondary battery, comprising:

a battery pack being mounted on a vehicle provided with an electric motor and an electric generator, in which the electric motor or an engine is used as a driving source, including a plurality of cells that are secondary batteries combined with each other and having positive and negative poles connected to the vehicle;

a voltage detector for detecting an output voltage of the battery pack;

a current detector for detecting a charge/discharge current of the battery pack;

a temperature detector for detecting the temperature within the battery pack;

a rotational speed detector for detecting the rotational speed of the electric motor or the engine, and a battery input/output controller for judging whether the start-up of the electric motor or the engine fails based on a voltage signal from the voltage detector, a current signal from the current detector, a temperature signal from the temperature detector, and a rotational speed signal from the rotational speed detector.

13. The input/output control device of the secondary battery according to claim 12, wherein the battery pack is used as a power source to start the start-up of the engine when an output by a start-up command from a driver is issued, and the start-up of the engine is stopped when the voltage value indicated by the voltage signal from the voltage detector of the battery pack becomes lower than a predetermined value, or the rotational speed signal from the rotational speed detector becomes lower than a predetermined rotational speed.

14. The input/output control device of the secondary battery according to claim 13, wherein after the start-up of the engine is stopped, the battery input/output controller carries out a short-time charging of the battery pack, and thereafter carrying out a start-up of the engine again.

15. The input/output control device of the secondary battery according to claim 13, wherein after the start-up of the engine is stopped, the battery input/output controller carries out a regeneration with respect to the battery pack by the revolving of the engine, and thereafter carrying out a start-up of the engine again.

* * * * *